(12) United States Patent
Guo

(10) Patent No.: US 12,248,511 B2
(45) Date of Patent: Mar. 11, 2025

(54) VIDEO RETRIEVAL METHOD AND APPARATUS, DEVICE, AND STORAGE MEDIUM

(71) Applicant: Tencent Technology (Shenzhen) Company Limited, Shenzhen (CN)

(72) Inventor: Hui Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 76 days.

(21) Appl. No.: 18/136,538

(22) Filed: Apr. 19, 2023

(65) Prior Publication Data

US 2023/0297617 A1    Sep. 21, 2023

Related U.S. Application Data

(63) Continuation of application No. PCT/CN2022/105871, filed on Jul. 15, 2022.

(30) Foreign Application Priority Data

Aug. 24, 2021  (CN) .......................... 202110973390.0

(51) Int. Cl.
G06F 16/78       (2019.01)
G06F 16/732      (2019.01)
(Continued)

(52) U.S. Cl.
CPC ...... *G06F 16/7857* (2019.01); *G06F 16/7328* (2019.01); *G06V 10/44* (2022.01); *G06V 10/54* (2022.01); *G06V 10/761* (2022.01)

(58) Field of Classification Search
CPC ............ G06F 16/7857; G06F 16/7328; G06F 16/7837; G06F 16/7335; G06V 10/44;
(Continued)

(56) References Cited

U.S. PATENT DOCUMENTS

| | | | |
|---|---|---|---|
| 11,074,495 B2 | 7/2021 | Zadeh et al. | |
| 2002/0136449 A1* | 9/2002 | Park | G06V 10/56 382/164 |

(Continued)

FOREIGN PATENT DOCUMENTS

| | | |
|---|---|---|
| CN | 111221993 A | 6/2020 |
| CN | 113254687 A | 8/2021 |

(Continued)

OTHER PUBLICATIONS

Tencent Technology, ISR, PCT/CN2022/105871, Aug. 25, 2022, 2 pgs.

(Continued)

*Primary Examiner* — Kavita Stanley
*Assistant Examiner* — Cecile H Vo
(74) *Attorney, Agent, or Firm* — Morgan, Lewis & Bockius LLP

(57) ABSTRACT

This application provides a video retrieval method performed by a computer device. The method includes: performing feature extraction on an image feature of a query video to obtain a first quantization feature, obtaining a second candidate video with a high category similarity to the query video based on the first quantization feature, and finally taking a second candidate video with a high content similarity to the query video as a target video. The quantization control parameters are adjusted according to the texture feature loss value corresponding to each training sample to cause the target quantization processing sub-model to learn the ranking ability of the target texture feature sub-model, to ensure that the ranking effect of two sub-models tend to be consistent, and an end-to-end model architecture enables the target quantization processing sub-model to obtain the corresponding quantization feature based on the image feature.

15 Claims, 11 Drawing Sheets

(51) Int. Cl.
 *G06F 16/783* (2019.01)
 *G06V 10/44* (2022.01)
 *G06V 10/54* (2022.01)
 *G06V 10/74* (2022.01)

(58) Field of Classification Search
 CPC ...... G06V 10/54; G06V 10/761; G06V 20/41; G06V 20/47; G06V 20/48; G06V 10/778; G06V 20/49; G06N 3/04; G06N 3/08; H04N 21/4728
 See application file for complete search history.

(56) References Cited

U.S. PATENT DOCUMENTS

| | | | |
|---|---|---|---|
| 2019/0332867 A1* | 10/2019 | Zhang | G06V 10/82 |
| 2019/0384987 A1 | 12/2019 | Li et al. | |
| 2021/0004589 A1* | 1/2021 | Turkelson | G06V 30/19173 |
| 2021/0026887 A1 | 1/2021 | Fukushima et al. | |
| 2021/0089785 A1* | 3/2021 | He | G06F 18/2411 |
| 2022/0318553 A1* | 10/2022 | Ben Yahia | G06N 3/08 |
| 2024/0037948 A1 | 2/2024 | Chen et al. | |

FOREIGN PATENT DOCUMENTS

| | | |
|---|---|---|
| CN | 113255625 A | 8/2021 |
| CN | 114282059 A | 4/2022 |
| WO | WO 2021017289 A1 | 2/2021 |

OTHER PUBLICATIONS

Tencent Technology, WO, PCT/CN2022/105871, Aug. 25, 2022, 5 pgs.
Tencent Technology, IPRP, PCT/CN2022/105871, Feb. 27, 2024, 6 pgs.
Tencent Technology, Extended European Search Report, EP Patent Application No. 22860095.3, Dec. 16, 2024, 14 pgs.

\* cited by examiner

VIDEO RETRIEVAL METHOD AND APPARATUS, DEVICE, AND STORAGE MEDIUM

CROSS-REFERENCE TO RELATED APPLICATIONS

This application is a continuation application of PCT Patent Application No. PCT/CN2022/105871, entitled "VIDEO RETRIEVAL METHOD AND APPARATUS, DEVICE, AND STORAGE MEDIUM" filed on Jul. 15, 2022, which claims priority to China Patent Application No. 202110973390.0, filed on Aug. 24, 2021, and entitled "VIDEO RETRIEVAL METHOD AND APPARATUS, DEVICE, AND STORAGE MEDIUM", the entirety of which is incorporated herein by reference.

FIELD OF THE TECHNOLOGY

This application relates to the field of computers, and in particular, to the field of artificial intelligence, and provides a video retrieval method and apparatus, a device, and a storage medium.

BACKGROUND OF THE DISCLOSURE

In the related art, a quantization feature is usually used as an index label of a video to retrieve and obtain a corresponding video. Generally, any one of the following methods is used to obtain a corresponding quantization feature:
  a first method, the corresponding quantization feature is obtained based on K-means clustering algorithm, but for a large-scale sample data clustering, in order to ensure the accuracy of index retrieval, it needs a lot of resources to obtain enough quantization features;
  a second method, the corresponding quantization feature is obtained based on product quantization (PQ), but the quantization feature obtained by the method will reduce the generation accuracy of quantization features due to the loss in the generation process, thus affecting a match performance of a video retrieval; and
  a third method, the corresponding quantization feature is obtained based on an in-depth learning neural network, but the neural network extracts an embedding feature of a video image, and then performs feature extraction on the embedding features to obtain the corresponding quantization feature, which will reduce the generation accuracy of the quantization features due to the loss in the generation process, thus affecting the match performance of the video retrieval.

SUMMARY

This embodiment of this application provides a video retrieval method and apparatus, a device, and a storage medium to solve the problems of low quantization efficiency and low accuracy.

In a first aspect, an embodiment of this application provides a video retrieval method performed by a computer device, the method including:
  performing feature extraction on a query video using a target image processing sub-model of a trained target video retrieval model to obtain a corresponding image feature;
  performing feature extraction on the image feature using a target quantization processing sub-model of the target video retrieval model to obtain a corresponding first quantization feature;
  identifying, from first candidate videos, at least one second candidate video whose associated category similarity to the query video meets a set category similarity requirement based on the first quantization feature; and
  identifying, among the at least one second candidate video, a target video whose associated content similarity to the query video meets a set content similarity requirement.

In a second aspect, an embodiment of this application also provides a computer device including a processor and a memory, the memory storing program codes which, when executed by the processor, cause the computer device to perform the operations of any one of the above video retrieval methods.

In a third aspect, an embodiment of this application also provides a non-transitory computer readable storage medium including program codes which, when executed by a processor of a computer device, cause the computer device to perform the operations of any one of the above video retrieval methods.

In a fourth aspect, an embodiment of this application also provides a computer program product or computer program including computer instructions stored in a computer readable storage medium. A processor of a computer device reads the computer instructions from a computer readable storage medium, and the processor executes the computer instructions to cause the computer device to perform the operations of any one of the above video retrieval methods.

The beneficial effects of this application are as follows.

This embodiment of this application provides a video retrieval method and apparatus, a device, and a storage medium, and the method includes: performing feature extraction on an image feature of a query video to obtain a first quantization feature, obtaining a second candidate video with a high category similarity to the query video based on the first quantization feature, and finally outputting a second candidate video with a high content similarity to the query video as a target video. Since the quantization control parameter of the target quantization processing sub-model is adjusted according to the texture feature loss value corresponding to each training sample, the target quantization processing sub-model learns the ranking ability of the target texture feature sub-model, which ensures that ranking effects of two sub-models tend to be consistent, and avoids a random ranking of the target quantization processing sub-model due to fixed quantization control parameters. Due to an end-to-end model architecture, the target quantization processing sub-model trained by the above-mentioned manner can obtain a corresponding quantization feature based on the image feature, which reduces the loss in the generation process of the quantization feature and improves the generation accuracy of the quantization feature. In addition, this embodiment of this application also optimizes the ranking ability of the target quantization processing sub-model and further improves a match performance of a video retrieval.

Other features and advantages of this application will be set forth in the description which follows, and in part will be obvious from the description, or may be learned by practice of this application. The objects and other advantages of this application may be realized and obtained by the structure particularly pointed out in the written specification, claims, and the appended drawings.

BRIEF DESCRIPTION OF THE DRAWINGS

The accompanying drawings described herein are used to provide a further understanding of this application and constitute a part of this application. The illustrative embodiments of this application and descriptions are used to explain this application and do not constitute undue limitations on this application. In the drawings.

DESCRIPTION OF EMBODIMENTS

Figure 1A:
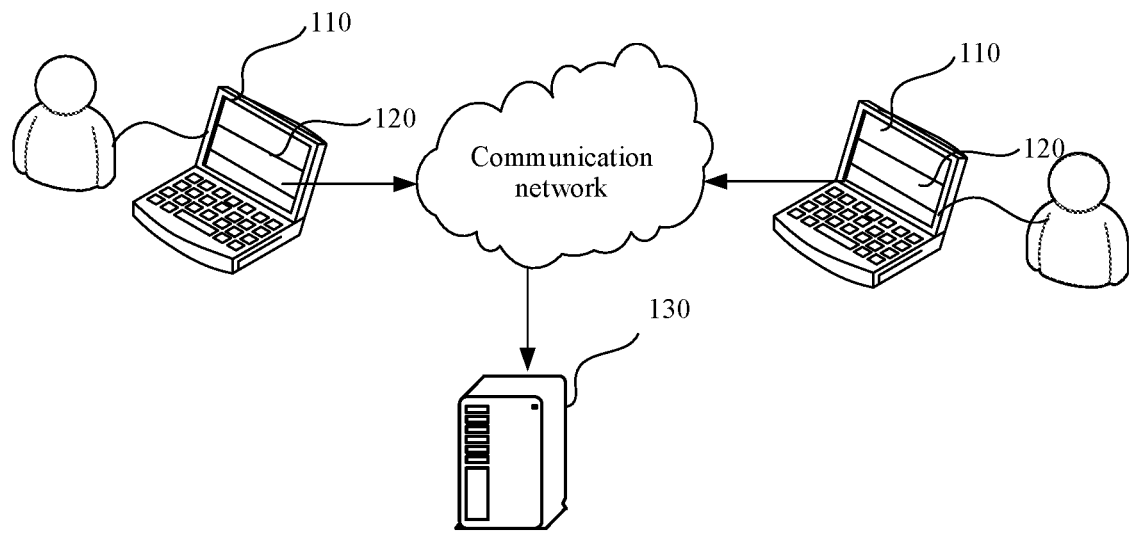
FIG. 1a is a schematic diagram of an application scenario in an embodiment of this application.

In order to make the objects, technical solutions and advantages of embodiments of this application clearer, the technical solutions of this application will be described clearly and completely with reference to the accompanying drawings in this embodiment of this application. Obviously, the described embodiment is a part of the technical solutions of this application, not the whole embodiment. Based on this embodiment recorded in this application documents, all the other embodiments obtained by ordinary technicians in the art without making any inventive effort fall within the scope of protection of the technical solution of this application.

Some terms in this embodiment of this application are explained below to facilitate understanding by those skilled in the art.

This embodiment of this application relates to the field of artificial intelligence (AI), and are designed based on machine learning (ML) and computer vision (CV) techniques. The solutions provided by this embodiment of this application relate to technologies such as in-depth learning and augmented reality of artificial intelligence, and are further illustrated by the following embodiments.

This embodiment of this application is briefly described below.

This embodiment of this application provides a video retrieval method and apparatus, a device, and a storage medium to solve the problems of low quantization efficiency and low accuracy. This embodiment of this application can be applied to various types of video retrieval scenes, for example, in video infringement scenarios, and a batch of videos with high content similarity to the query video are matched by using the video retrieval method provided by this embodiment of the application, and the matched videos are determined as infringing videos.

The method includes: performing feature extraction on an image feature of a query video to obtain a first quantization feature, obtaining a second candidate video with a high category similarity to the query video based on the first quantization feature, and finally outputting a second candidate video with a high content similarity to the query video as a target video. Since the quantization control parameter of the target quantization processing sub-model is adjusted according to the texture feature loss value corresponding to each training sample, the target quantization processing sub-model learns the ranking ability of the target texture feature sub-model, which ensures that ranking effects of two sub-models tend to be consistent, and avoids a random ranking of the target quantization processing sub-model due to fixed quantization control parameters. Due to an end-to-end model architecture, the target quantization processing sub-model trained by the above-mentioned manner can obtain a corresponding quantization feature based on the image feature, which reduces the loss in the generation process of the quantization feature and improves the generation accuracy of the quantization feature. In addition, this embodiment of this application also optimizes the ranking ability of the target quantization processing sub-model and further improves a match performance of a video retrieval.

This embodiment of this application will be described below with reference to the drawings in the specification. This embodiment described here is only used to illustrate and explain this application, and are not used to limit this application, and this embodiment of this application and the features in this embodiment can be combined with each other without conflict.

Figure 1B:
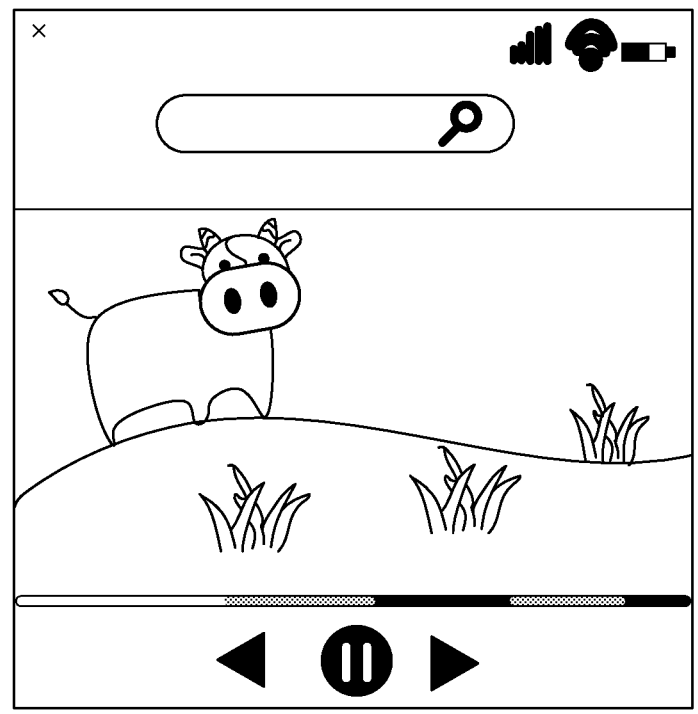
FIG. 1b is a schematic diagram of a first display interface provided by an embodiment of this application.

With reference to the schematic diagrams shown in FIGS. 1a and 1b, in an application scenario of an embodiment of this application, two physical terminal devices 110 and one server 130 are included.

A target object (for example, a user) can log into a video retrieval client through a physical terminal device 110, and a retrieval interface is presented on a display screen 120 of the physical terminal device 110; then, a target object inputs an image of a query video in a search interface, to cause a target video retrieval model running on a target server 130 obtains a target video with a higher content similarity to the query video based on the image of the query video from a huge video library connected to a background port; after receiving all the target videos returned by the target server 130, the physical terminal device 110 presents each of target videos on the display interface of the display screen 120, and at the same time, the user can also view the video details of the selected target video by clicking a page or other gesture operations, and a similar segment or a repeated segment of the target video and the query video will be marked on a progress bar.

The display interface shown in FIG. 1b presents an excerpt segment of a certain television series, and the color of a corresponding progress bar is white for the played segment; the color of a corresponding progress bar is black for an unplayed segment; in addition, the color of a corresponding progress bar is grey for a similar segment or a repeated segment, in this way, a user can roughly estimate the similarity between a target video and a query video through the color of the progress bar, to facilitate the user to determine the infringement of video creation.

Figure 1C:
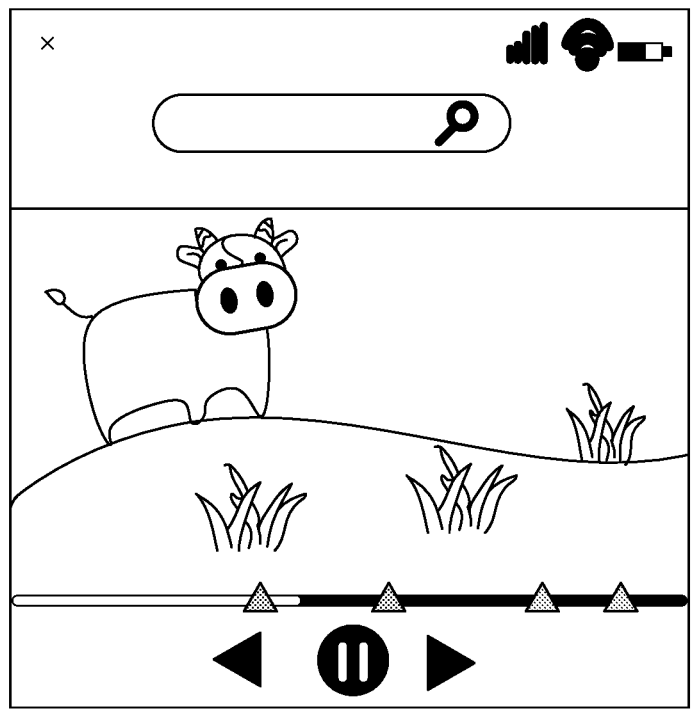
FIG. 1c is a schematic diagram of a second display interface provided by an embodiment of this application.

The display interface shown in FIG. 1c presents an excerpt segment of a certain television series, and the color of a corresponding progress bar is white for the played segment; the color of a corresponding progress bar is black for an unplayed segment; a triangle mark point or mark points with other shapes are marked on the progress bar for a similar segment or a repeated segment to mark a start point and an end point of these segments, in this way, a user can directly jump to the corresponding scenario by clicking the mark point; likewise, the user can also roughly estimate the similarity between the target video and the query video through the number of mark points on the progress bar.

In this embodiment of this application, the physical terminal device 110 is an electronic device used by a user, and the electronic device can be a computer device such as a personal computer, a mobile phone, a tablet computer, a notebook computer, an electronic book reader, and a smart home.

Each physical terminal device 110 communicates with the target server 130 through a communication network. In one embodiment, the communication network is a wired or wireless network, and therefore, each physical terminal device 110 may directly or indirectly establish a communication connection with the target server 130 through the wired or wireless network, and this application is not limited here.

The target server 130 can be an independent physical server, and can also be a server cluster or distributed system composed of a plurality of physical servers, and can also be a cloud server providing basic cloud computing services, such as a cloud service, a cloud database, a cloud computing, a cloud function, a cloud storage, a network service, a cloud communication, a middle ware service, a domain name service, a security service, a content delivery network (CDN), large data, an artificial intelligence platform, etc., and this application is not limited here.

Figure 1D:
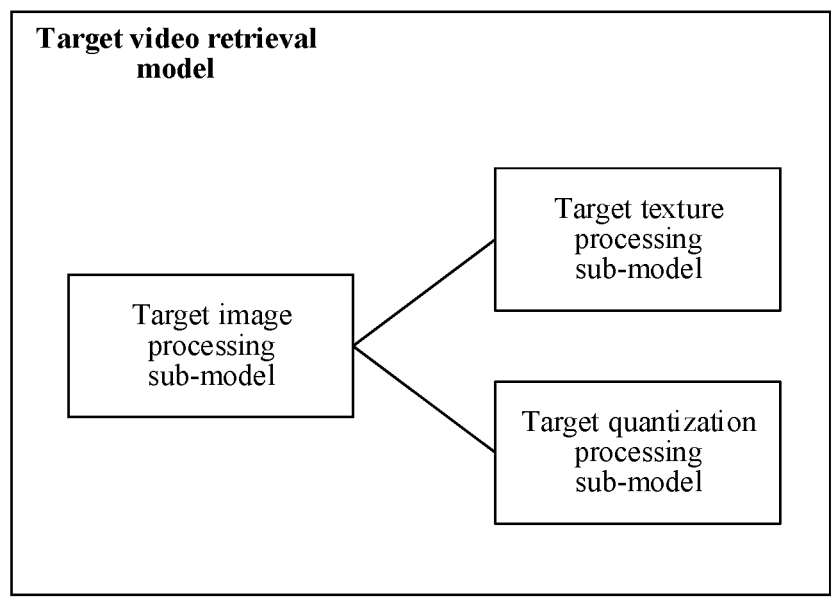
FIG. 1d is a schematic architecture diagram of a target video retrieval model provided by an embodiment of this application.

A target video retrieval model is deployed on the target server 130, and as shown in FIG. 1d, the target video retrieval model includes a target image processing sub-model, a target texture processing sub-model and a target quantization processing sub-model.

The target image processing sub-model and the target texture processing sub-model are in-depth learning network models constructed by using the network architecture of ResNet_101, and are pre-trained based on imageNet. ImageNet is an open-source data set for large-scale general object recognition. There are a lot of pre-marked image data in imageNet, and imageNet probably contains 1000 kinds of image data. Therefore, the in-depth learning network model based on imageNet pre-training has better stability of model parameters and universality of the whole model.

In addition, a network architecture other than ResNet_101 can be used to build an in-depth learning network model, which can be pre-trained based on other large-scale data sets, such as an in-depth learning network model obtained based on open image pre-training.

The complex high-dimensional image features are processed by binary quantization using the target quantization processing sub-model, and the high-dimensional image feature is compressed into binary codes with a specified number of bits (namely, a quantization feature). In the process of video retrieval, the corresponding target video is matched by taking the quantization feature as an index, which greatly reduces the calculation time and complexity, and is more conducive to calculation. Therefore, it is very beneficial to the retrieval of massive data.

In addition, for binary coding, each bit has a value of 0 or 1, such as a binary code 0100, which compresses 128-dimensional image features into 4 bits.

Figure 1E:
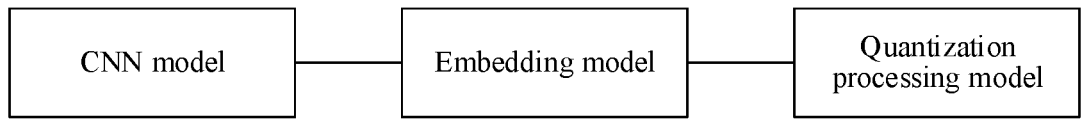
FIG. 1e is a schematic architecture diagram of a quantization processing model used in the related art.

Different from the traditional quantization processing model shown in FIG. 1e, the target texture processing sub-model and the target quantization processing sub-model in this embodiment of this application are two sub-models which are placed in parallel. The benefit of such deployment is that in the training phase, the quantization control parameter of the target quantization processing sub-model is adjusted according to the texture feature loss value corresponding to each training sample, the target quantization processing sub-model learns the ranking ability of the target texture feature sub-model, which ensures that the ranking effects of the two sub-models tend to be consistent, and avoids the random ranking of the target quantization processing sub-model due to the fixed quantization control parameters.

In the application stage, compared with the non-end-to-end model architecture shown in FIG. 1e, this embodiment of this application adopts the end-to-end model architecture, which can obtain a corresponding quantization feature based on the image feature, reduce the loss in the process of generating the quantization feature and improve the generation accuracy of the quantization feature. In addition, this embodiment of this application also optimizes the ranking ability of the target quantization processing sub-model and further improves the match performance of the video retrieval.

Moreover, this embodiment of this application builds a target video retrieval model based on artificial intelligence technology, and compared with the traditional K-means clustering algorithm, it has better processing speed and match performance and consumes less resources when dealing with large-scale retrieval videos.

In the training process of the target video retrieval model, it is specifically divided into a pre-training stage and a fine-tuning joint learning stage; however, the training data used in the two training stages are the same, and the difference is that the network parameters needing to be learned and the generated loss values in the two training stages are different.

In the pre-training stage, the parameters of an image processing sub-model to be trained and a texture processing sub-model to be trained are adjusted using an image processing texture feature loss value to obtain a candidate image processing sub-model and a candidate texture processing sub-model; In the fine-tuning joint learning stage, the parameters of the candidate texture processing sub-model are adjusted by using the texture feature loss value, and the parameters of the candidate image processing sub-model and the quantization processing sub-model to be trained are adjusted by using the quantization feature loss value, to obtain the target image processing sub-model, the target texture processing sub-model, and the target quantization processing sub-model.

Figure 2A:
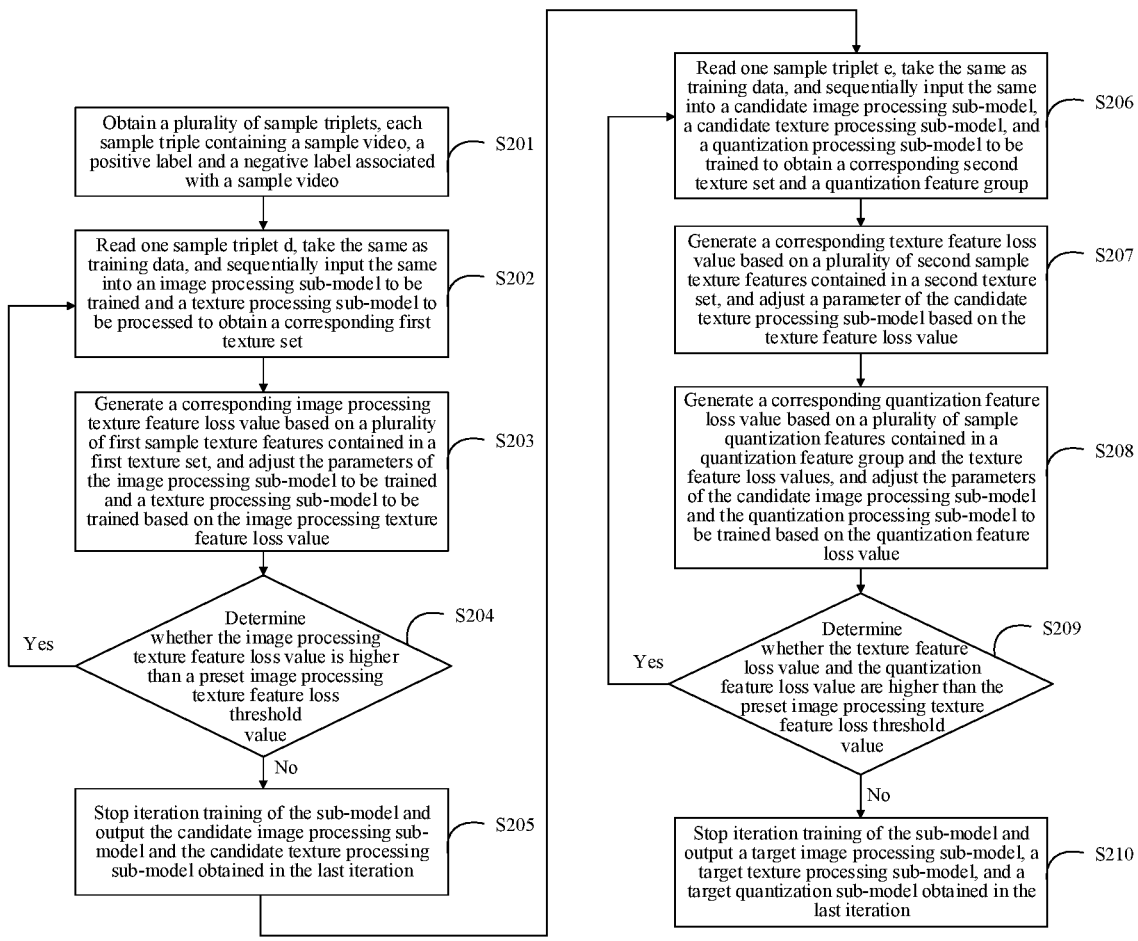
FIG. 2a is a schematic flow diagram of a training target video retrieval model provided by an embodiment of this application.

To facilitate understanding, the training process of the target video retrieval model is introduced with reference to the schematic flow diagram shown in FIG. 2a.

S201: Obtain a plurality of sample triplets, each sample triplet containing a sample video, a positive label and a negative label associated with the sample video.

Compared with the traditional quantization processing method, this embodiment of this application uses the labeled training data, the quantization processing sub-model to be trained can learn the positive label and the negative label at the same time, thus improving the match effect of the target quantization processing sub-model.

The positive label refers to a sample video with a higher content similarity to the sample video, and the negative label refers to a sample video with only a small amount of the same or similar content as the sample video.

Figure 2B:
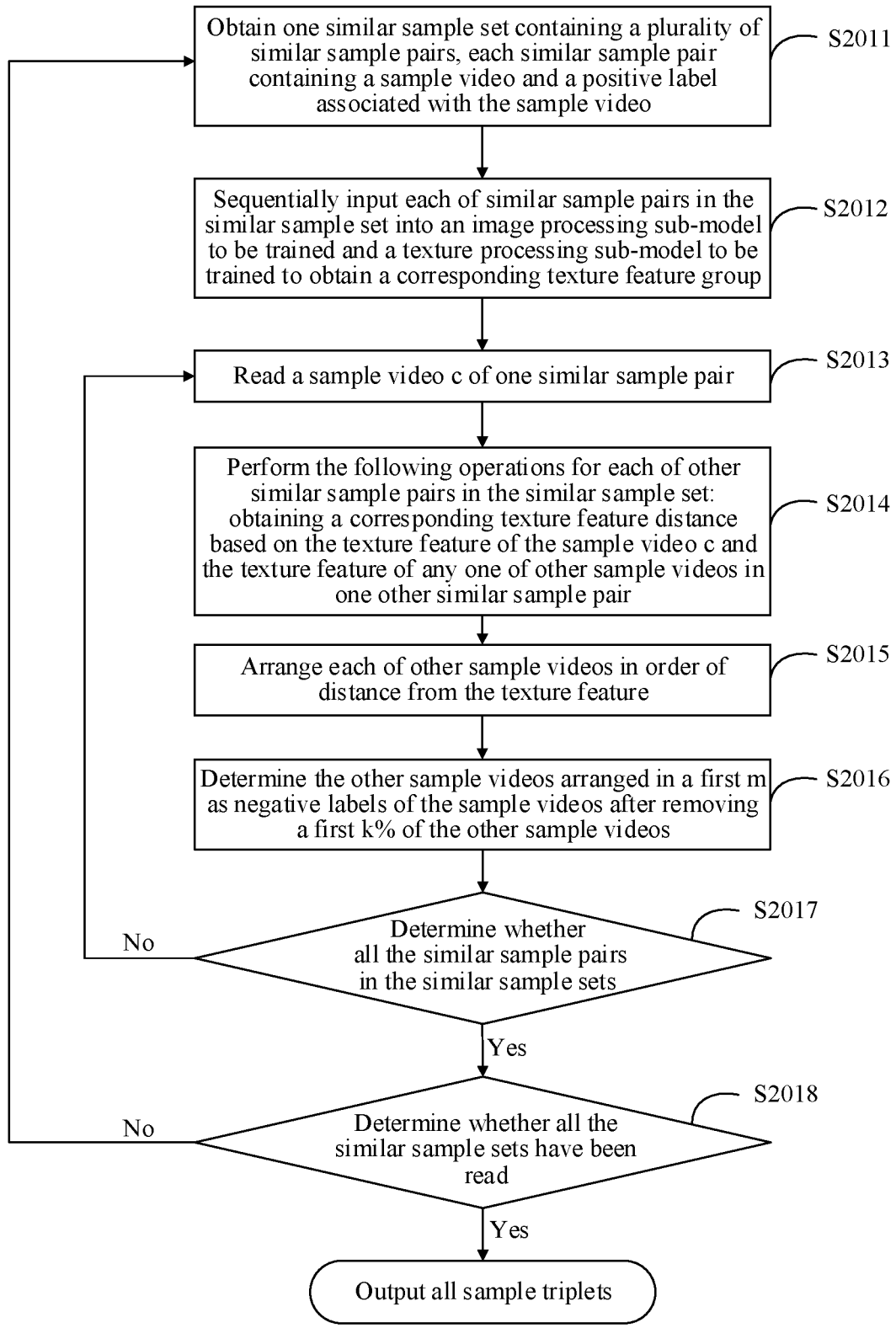
FIG. 2b is a schematic flow diagram of mining a plurality of sample triplets provided by an embodiment of this application.

With reference to the schematic flow diagram shown in FIG. 2b, this embodiment of this application can obtain a plurality of sample triplets by executing the following operations:

S2011: Obtain one similar sample set containing a plurality of similar sample pairs, and each similar sample pair contains a sample video and a positive label associated with the sample video.

S2012: Sequentially input each of similar sample pairs in the similar sample set into an image processing sub-model to be trained and a texture processing sub-model to be trained to obtain a corresponding texture feature group.

The image processing sub-model to be trained and the texture processing sub-model to be trained are in-depth learning network models which are pre-trained based on the large-scale general object recognition open-source data set ImageNet. The corresponding texture feature groups of each of similar sample pairs can be obtained by sequentially inputting each of similar sample pairs into the above two sub-models, and each texture feature group includes the texture feature of the sample video and the texture feature of the positive label.

S2013: Read a sample video c of one similar sample pair;

S2014: Perform the following operations for each of other similar sample pairs in the similar sample set: obtaining a corresponding texture feature distance based on the texture feature of the sample video c and the texture feature of any one of other sample videos in one other similar sample pair.

In one embodiment, a Euclidean distance between two texture features is taken as the corresponding texture feature distance. The smaller the value of Euclidean distance is, the higher the content similarity between the two sample videos is characterized; on the contrary, the larger the value of Euclidean distance is, the lower the content similarity between the two sample videos is characterized.

S2015: Arrange each of the other sample videos in order of distance from the texture feature.

S2016: Determine the other sample videos arranged in a first m as negative labels of the sample videos after removing a first k % of the other sample videos.

Each of other sample videos is arranged according to the order of the texture feature distance from near to far, and it can be seen from the above-mentioned introduction of the texture feature distance that the content similarity between the other sample video of the first k % and the sample video is very high. However, the negative label that needs to be mined in this embodiment of this application is that there are only a few sample videos with the same or similar contents as the sample videos. Obviously, the other sample videos of the first k % does not meet the definition of the negative label and are removed as interference noise. k is a controllable value, and the greater the interference noise is, the larger the corresponding value of k is.

However, other sample videos ranked extremely low do not conform to the definition of negative label because they have almost the same or similar content with the sample videos. Therefore, in this embodiment of this application, other sample videos ranked in the first m after removing the first k % of other sample videos are determined as the negative labels of the sample videos.

For example, assuming that similar sample pairs are (sample video 1, sample video 2), Table 1 shows texture feature distances between other sample videos and sample video 1, removing the first k % of other sample videos, such as the sample video 3 and the sample video 6, and removing the sample video 8 and the sample video 9 with extremely low ranking, and the following sample triplets are finally obtained by screening: (sample video 1, sample video 2, other sample video 7), (sample video 1, sample video 2, other sample video 4), and (sample video 1, sample video 2, other sample video 5).

TABLE 1

| Name of other sample videos | Texture feature distance |
| --- | --- |
| Other sample video 3 | 0.5 |
| Other sample video 6 | 0.55 |
| Other sample video 7 | 0.8 |
| Other sample video 4 | 0.83 |
| Other sample video 5 | 0.9 |
| Other sample video 8 | 1.2 |
| Other sample video 9 | 1.5 |

S2017: Determine whether all the similar sample pairs in the similar sample sets have been read, and if so, execute operation S2018; otherwise, return operation S2013.

S2018: Determine whether all the similar sample sets have been read, and if so, output all the sample triplets; otherwise, return operation S2011.

S202: Read one sample triplet d, take the same as training data, and sequentially input the same into an image processing sub-model to be trained and a texture processing sub-model to be processed to obtain a corresponding first texture set.

S203: Generate a corresponding image processing texture feature loss value based on a plurality of first sample texture features contained in a first texture set, and adjust the parameters of the image processing sub-model to be trained and the texture processing sub-model to be trained based on the image processing texture feature loss value.

A corresponding image processing texture feature loss value is generated using the following Formula 1; then, the parameters of the image processing sub-model to be trained and the texture processing sub-model to be trained are adjusted by using the stochastic gradient descent (SGD) method based on the loss value of image processing texture features.

In Formula 1, $L_{em}$ is an image processing texture feature loss value, $x_a$ is a first sample texture feature of a sample video, $x_p$ is a first sample texture feature of a positive label, and then $x_n$ is a first sample texture feature of a negative label; $\|x_a - x_p\|$ characterizes a texture feature distance between positive sample pairs, then $\|x_a - x_n\|$ characterizes a texture feature distance between negative sample pairs; and margin_em characterizes a texture control parameter.

$$L_{em}=\max(\|x_a-x_p\|-\|x_a-x_n\|+\text{margin\_}em) \quad \text{Formula 1:}$$

S204: Determine whether the image processing texture feature loss value is higher than a preset image processing texture feature loss threshold value, and if so, return operation S202; otherwise, execute operation S205.

S205: Stop iteration training of the sub-model and output the candidate image processing sub-model and the candidate texture processing sub-model obtained in the last iteration.

S206: Read one sample triplet e, take the same as training data, and sequentially input the same into the candidate image processing sub-model, the candidate texture processing sub-model and a quantization processing sub-model to be trained to obtain a corresponding second texture set and a quantization feature group.

S207: Generate a corresponding texture feature loss value based on a plurality of second sample texture features contained in a second texture set, and adjust a parameter of the candidate texture processing sub-model based on the texture feature loss value.

A corresponding texture feature loss value is generated using the following Formula 2; then, the parameters of the candidate texture processing sub-model are adjusted by using the SGD method based on the texture feature loss value.

In Formula 2, $L_{em}'$ is an image processing texture feature loss value, $x_a'$ is a second sample texture feature of a sample video, $x_p'$ is a second sample texture feature of a positive label, and then $x_n'$ is a second sample texture feature of a negative label; $\|x_a'-x_p'\|$ characterizes a texture feature distance between positive sample pairs, then $\|x_a'-x_n'\|$ characterizes a texture feature distance between negative sample pairs; and margin_em characterizes a texture control parameter.

$$L_{em}'=\max(\|x_a'-x_p'\|-\|x_a'-x_n'\|+\text{margin\_}em) \quad \text{Formula 2:}$$

S208: Generate a corresponding quantization feature loss value based on a plurality of sample quantization features contained in a quantization feature group and the texture feature loss values, and adjust the parameters of the candidate image processing sub-model and the quantization processing sub-model to be trained based on the quantization feature loss value.

Figure 2C:
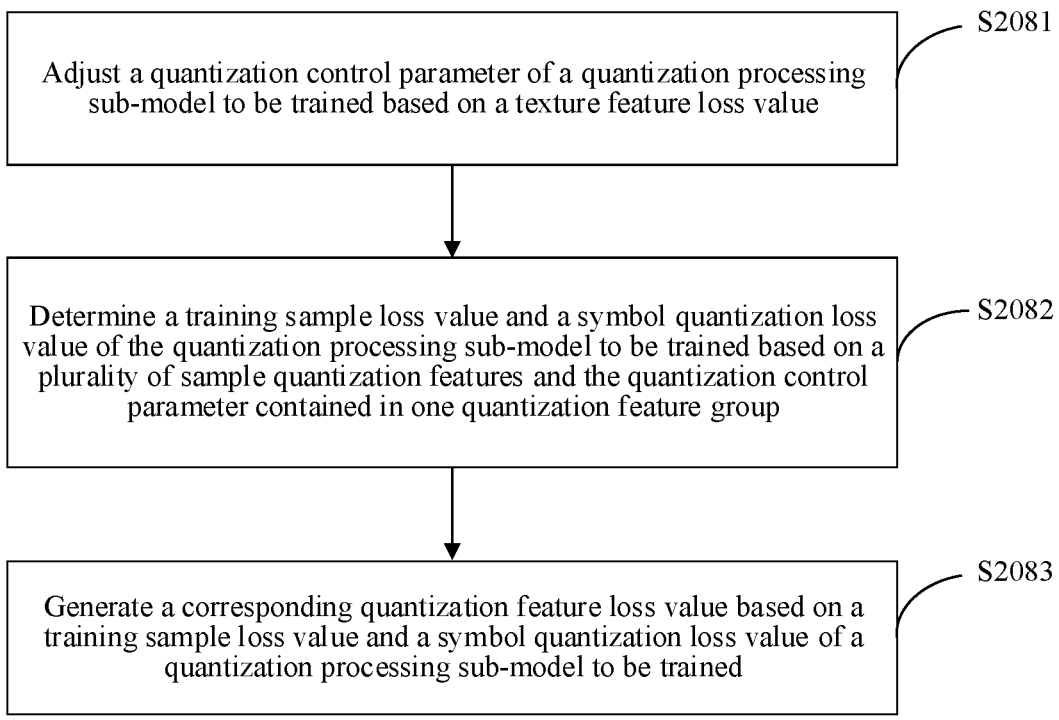
FIG. 2c is a schematic flow diagram of a first generation of a quantization feature loss value provided by an embodiment of this application.

A first generation of a quantization feature loss value is introduced with reference to the schematic flow diagram shown in FIG. 2c.

S2081: Adjust a quantization control parameter of the quantization processing sub-model to be trained based on the texture feature loss value.

The quantization control parameters of an i-th sample triplet are calculated by using the following Formula 3. Specifically, margin_i characterizes the quantization control parameter of the i-th sample triplet, margin0 is a preset Hamming distance, and Mem is the ratio between the texture feature distance and the Hamming distance, and $L_{em\_i}$ is the texture feature loss value of the i-th sample triplet.

$$\text{margin\_}i=\text{margin}0*L_{em\_}i/\text{Mem} \quad \text{Formula 3:}$$

S2082: Determine a training sample loss value and a symbol quantization loss value of the quantization processing sub-model to be trained based on a plurality of sample quantization features and the quantization control parameter contained in one quantization feature group;

The following Formula 4 is the formula for calculating the loss value of training samples. $L_{triplet}$ is the training sample loss value, $x_a^q$ is a sample quantization feature of a sample video, $x_p^q$ is a sample quantization feature of a positive label, $x_n^q$ is a sample quantization feature of a negative label, $\|x_a^q-x_p^q\|$ characterizes a quantization feature distance between positive sample pairs, $\|x_a^q-x_n^q\|$ characterizes a quantization feature distance between negative sample pairs, and margin_i characterizes a quantization control parameter of the i-th sample triplet.

$$L_{triplet}=\max(\|x_a^q-x_p^q\|-\|x_a^q-x_n^q\|+\text{margin\_}i) \quad \text{Formula 4:}$$

Each bit in the sample quantization feature is symbol quantized using the following Formula 5 to obtain the symbol quantization feature; A corresponding symbol quantization loss value is then generated based on the sample quantization feature and the symbol quantization feature using the following Formula 6.

$L_{coding}$ is a symbol quantization loss value, ui characterizes an i-th bit in a sample quantization feature, and bi characterizes an i-th bit of the symbol quantization feature; if ui is a negative number, then the value of bi is −1, otherwise, the value of bi is 1.

$$bi = \text{sgn}(ui) = \begin{Bmatrix} -1, & \text{if } ui < 0 \\ 1, & \text{else} \end{Bmatrix} \quad \text{Formula 5}$$

$$L_{coding} = \sum_{i=1}^{128}(bi-ui)^2 \quad \text{Formula 6}$$

S2083: Generate a corresponding quantization feature loss value based on a training sample loss value and a symbol quantization loss value of a quantization processing sub-model to be trained.

A corresponding quantization feature loss value is generated using the following Formula 7; then, the parameters of the candidate image processing sub-model and the quantization processing sub-model to be trained are adjusted by using the SGD method based on the quantization feature loss value.

In Formula 7, $L_q$ is the quantization feature loss value, $L_{triplet}$ is the training sample loss value of the quantization processing sub-model to be trained, $w_{21}$ is the weight allocated to the training sample loss value, $L_{coding}$ is the symbol quantization loss value of the quantization processing sub-model to be trained, and $w_{22}$ is the weight allocated to the symbol quantization loss value.

$$L_q=w_{21}L_{triplet}+w_{22}L_{coding} \quad \text{Formula 7:}$$

Figure 2D:
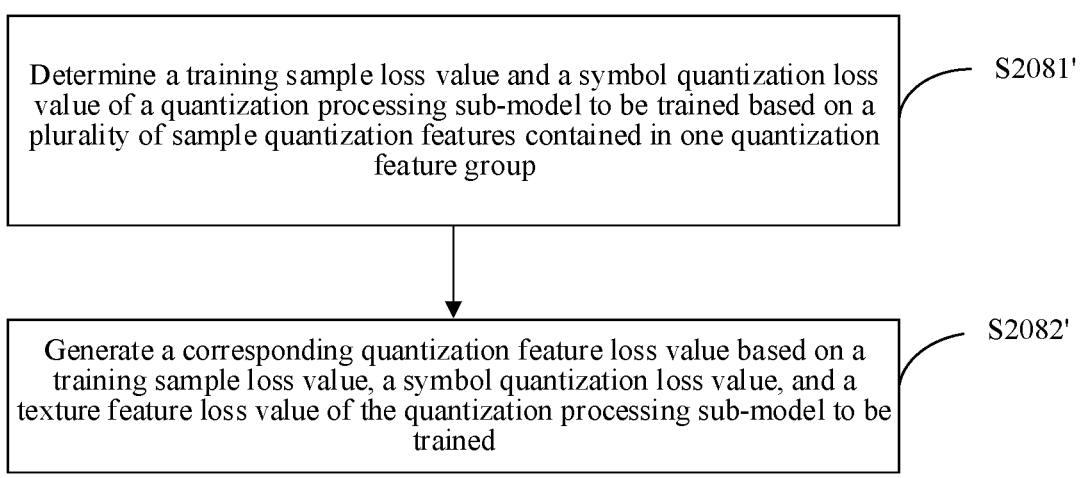
FIG. 2d is a schematic flow diagram of a second generation of a quantization feature loss value provided by an embodiment of this application.

With reference to the schematic flow diagram shown in FIG. 2d, embodiments of this application also provide a second way to generate a quantization feature loss value.

S2081': Determine a training sample loss value and a symbol quantization loss value of the quantization processing sub-model to be trained based on a plurality of sample quantization features contained in one quantization feature group;

The quantization features of a plurality of samples are substituted into Formula 4, and a corresponding loss value of training samples is generated; however, at this time, the value of margin_i in Formula 4 is the same as that of margin_em.

A plurality of sample quantization features are sequentially substituted into Formulas 5 to 6 to obtain corresponding symbol quantization loss values. The related formulas have been introduced in the previous article, and will not be described here.

S2082': Generate a corresponding quantization feature loss value based on a training sample loss value, a symbol quantization loss value, and the texture feature loss value of the quantization processing sub-model to be trained.

A corresponding quantization feature loss value is generated using the following Formula 8; $L_q$ is the quantization feature loss value, $L_{triplet}$ is the training sample loss value of the quantization processing sub-model to be trained, $w_{21}$ and $L_{em}'$ are the weights allocated to the training sample loss value, $L_{coding}$ is the symbol quantization loss value of the quantization processing sub-model to be trained, and $w_{22}$ is the weight allocated to the symbol quantization loss value.

$$L_q = w_{21}(L_{em}' * L_{triplet}) + w_{22} L_{coding} \quad \text{Formula 8:}$$

S209: Determine whether the texture feature loss value and the quantization feature loss value are higher than the preset image processing texture feature loss threshold value, and if so, return operation S206; otherwise, execute operation S210.

S210: Stop iteration training of the sub-model and output the target image processing sub-model, the target texture processing sub-model, and the target quantization processing sub-model obtained in the last iteration.

Figure 3A:
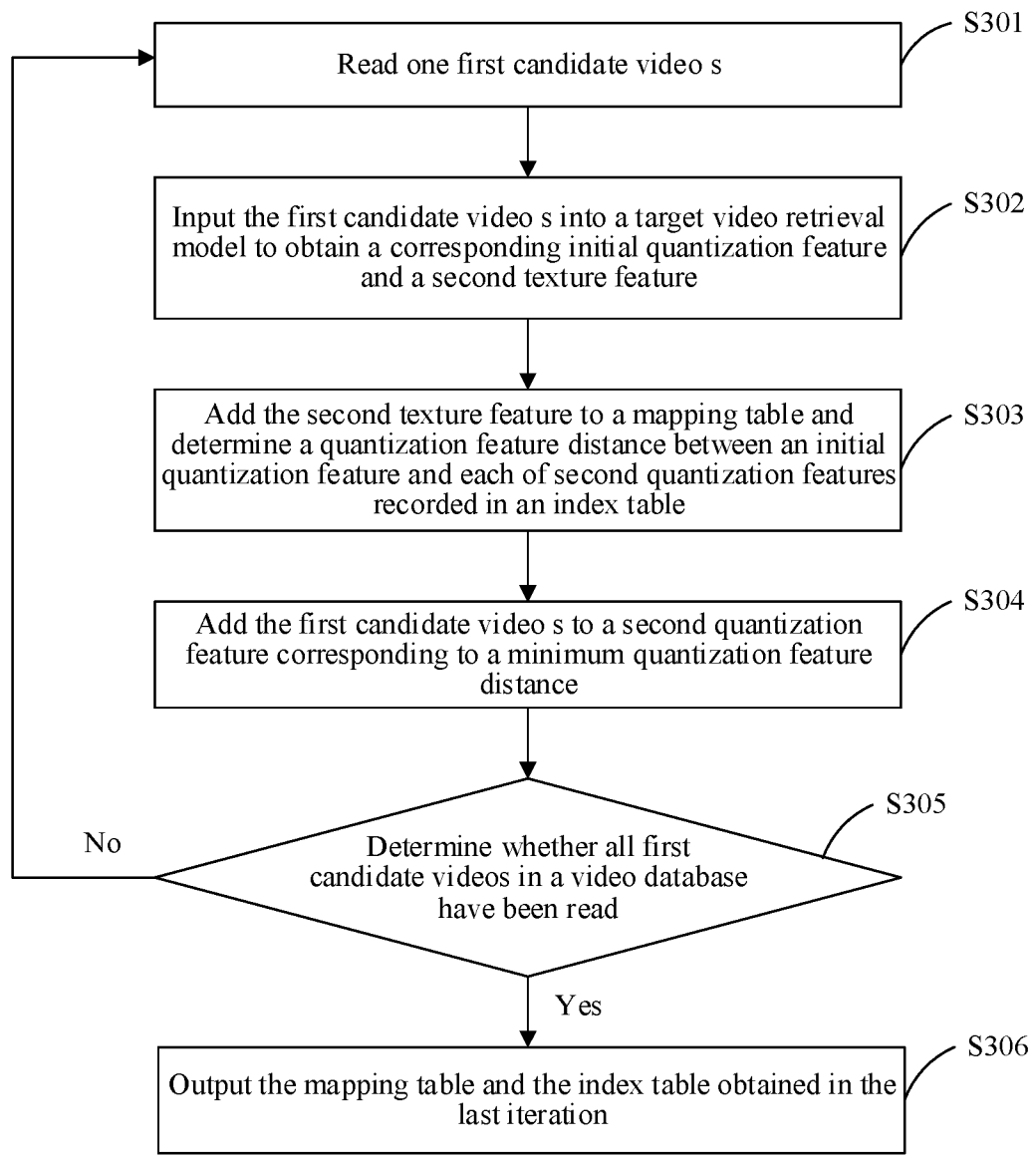
FIG. 3a is a schematic flow diagram of establishing an index table and a mapping table provided by an embodiment of this application.
Figure 3B:
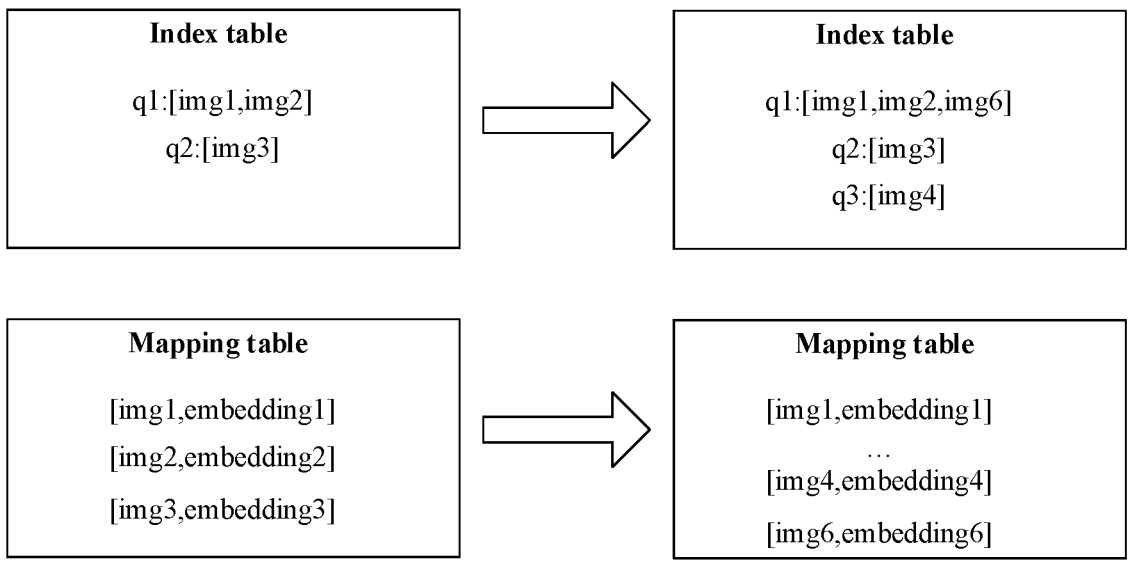
FIG. 3b is a logical schematic diagram of establishing an index table and a mapping table provided by an embodiment of this application.

Next, with reference to the schematic flow diagram shown in FIG. 3a and the logic diagram shown in FIG. 3b, an index table and a mapping table of a video database are established by using a trained target video retrieval model.

S301: Read one first candidate video s.

S302: Input the first candidate video s into a target video retrieval model to obtain a corresponding initial quantization feature and a second texture feature.

S303: Add the second texture feature to the mapping table and determine a quantization feature distance between the initial quantization feature and each of second quantization features recorded in the index table.

S304: Add the first candidate video s to a second quantization feature corresponding to a minimum quantization feature distance.

S305: Determine whether all the first candidate videos in the video database have been read, and if so, execute operation S306; otherwise, return operation S301.

S306: Output the mapping table and the index table obtained in the last iteration.

When operation S303 is executed, if the index table has a null value, the initial quantization feature of the first candidate video s is added to the index table as the second quantization feature. The index table is shown in Lindex: [q1:[img1, img2, img6], q2:[img3], q3:[img4]], the table includes a plurality of second quantization features, each quantization feature corresponds to at least one first candidate video, and therefore each second quantization feature characterizes a video category to which the corresponding at least one first candidate video belongs. The mapping table is shown as T: [[img1, embedding1], [img2, embedding2] . . . [img6, embedding6]], and the table includes a plurality of first candidate videos, and corresponding second texture features.

In addition, for the first candidate video newly added into the video database, the flow as shown in FIG. 3a can also be executed to establish a corresponding indexing relationship and mapping relationship.

Figure 4A:
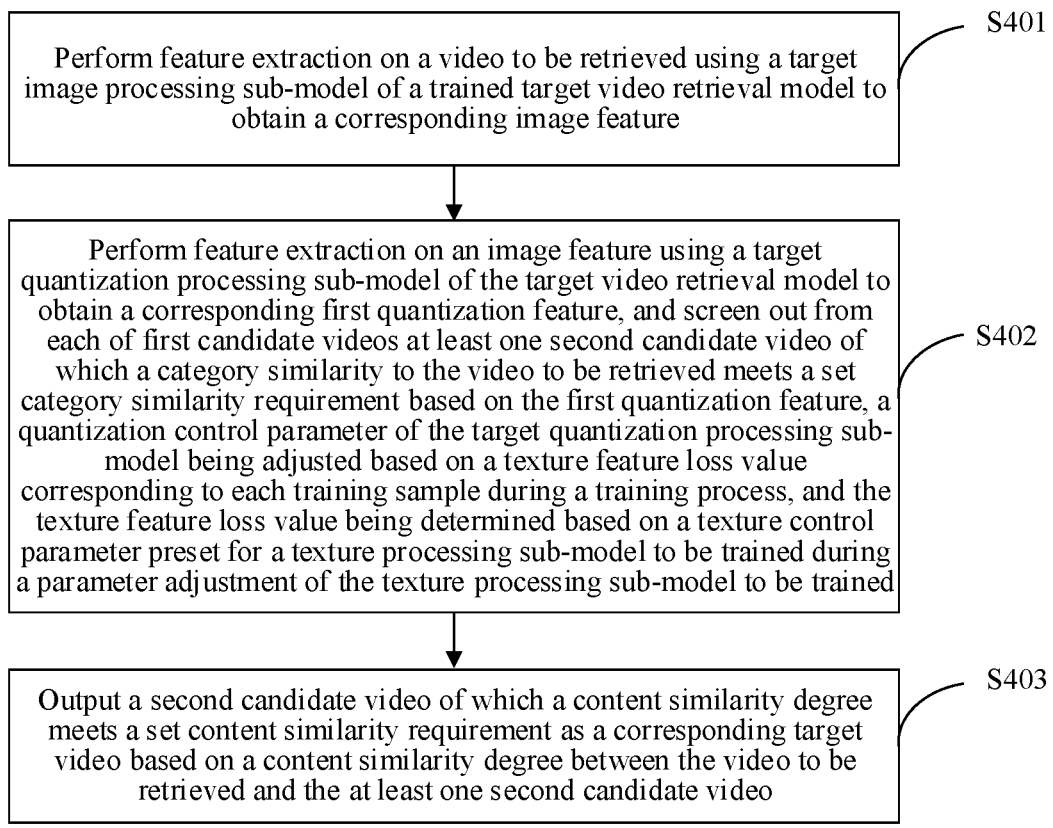
FIG. 4a is a schematic flow diagram of a video retrieval method provided by an embodiment of this application.

Next, with reference to the schematic flow diagram shown in FIG. 4a, the video retrieval method provided by this embodiment of this application is applied on the trained target video retrieval model.

S401: Perform feature extraction on a query video using a target image processing sub-model of a trained target video retrieval model to obtain a corresponding image feature.

When operation S401 is executed, the complete video of the query video can be input into the target image processing sub-model to obtain one corresponding image feature; it is also possible to extract key frames from a query video, and then input the obtained plurality of key frames into a target image processing sub-model to obtain a corresponding plurality of image features.

S402: Perform feature extraction on the image feature using a target quantization processing sub-model of the target video retrieval model to obtain a corresponding first quantization feature, and screen out from each of first candidate videos at least one second candidate video whose associated category similarity to the query video meets a set category similarity requirement based on the first quantization feature, a quantization control parameter of the target quantization processing sub-model being adjusted based on a texture feature loss value corresponding to each training sample during a training process, and the texture feature loss value being determined based on a texture control parameter preset for a texture processing sub-model to be trained during a parameter adjustment of the texture processing sub-model to be trained.

The quantization control parameter of the target quantization processing sub-model is adjusted according to the texture feature loss value corresponding to each training sample, the target quantization processing sub-model learns the ranking ability of the target texture feature sub-model, which ensures that the ranking effects of the two sub-models tend to be consistent, and avoids the random ranking of the target quantization processing sub-model due to the fixed quantization control parameters. The end-to-end model architecture enables the target quantization processing sub-model to obtain a corresponding quantization feature based on the image feature, which reduces the loss in the process of generating the quantization feature and improves the generation accuracy of the quantization feature. In addition, this embodiment of this application also optimizes the ranking ability of the target quantization processing sub-model and further improves the match performance of the video retrieval.

According to the introduction above, the index table contains a plurality of second quantization features, and each quantization feature corresponds to at least one first candidate video. Therefore, when operation S402 is executed, a quantization feature distance between the first quantization feature and the second quantization feature of each of first candidate videos is determined, and then the first candidate video of which the quantization feature distance is lower than a preset quantization feature distance threshold value is determined as a second candidate video.

S403: Output the second candidate video whose associated content similarity to the query video meets a set content similarity requirement as a corresponding target video based on a content similarity between the query video and the at least one second candidate video.

In an embodiment of this application, a complete video of a query video can be used as a model input, or a plurality of obtained key frames can be used as a model input; therefore, the following several methods for obtaining a target video are provided for different model inputs.

Mode 1. For the above two models, the input is suitable, and the target video is obtained by screening according to the texture feature distance.

In an embodiment, feature extraction is performed on the image feature using the target texture processing sub-model to obtain a corresponding first texture feature; Then, the following operations are performed for at least one second candidate video: determining a texture feature distance between the first texture feature and a second texture feature of one second candidate video, determining that a content similarity between the query video and the second candidate video meeting the set content similarity requirement when the texture feature distance being lower than a preset texture feature distance threshold value, and outputting the second candidate video as the target video, the second texture feature characterizing texture information of the second candidate video. In this embodiment of this application, a variety of distance calculation methods, such as a Euclidean distance and a Hamming distance, can be used to calculate a quantization feature distance and a texture feature distance; no matter which distance calculation method is used, if the value of the distance is small, it represents that the content similarity to two videos is high; on the contrary, if the value of the distance is larger, it represents that the content similarity between two videos is low, which will not be repeated in the future.

Mode 2. Taking the complete video as the model input, the target video is obtained by screening according to the content repetition degree.

In this embodiment, the following operations are performed for the at least one second candidate video:
  determining a ratio between a total matching duration and a comparison duration as a content repetition degree between the query video and one second candidate video, the total matching duration being obtained based on a matching duration between the at least one second candidate video and the query video, and the comparison duration being a duration value of a shorter video duration in the query video and the second candidate video; and
  determining that a content similarity between the query video and the second candidate video meeting the set content similarity requirement when the content repetition degree exceeding a set content repetition degree threshold value, and outputting the second candidate video as the target video.

For example, assuming that the video duration of the query video is 30 s, and matching duration between each second candidate video and the query video is shown in Table 2, the content repetition degree between the query video and each of second candidate videos is obtained by using Mode 2, and finally the second candidate videos 1 to 3 are returned to the user as target videos.

TABLE 2

| The name of second candidate video | Video duration | Matching duration | Content repetition degree |
| --- | --- | --- | --- |
| Second candidate video 1 | 15 s | 5 s | 6 |
| Second candidate video 2 | 20 s | 10 s | 4.5 |
| Second candidate video 3 | 25 s | 20 s | 3.6 |
| Second candidate video 4 | 60 s | 35 s | 3 |
| Second candidate video 5 | 120 s | 20 s | 3 |

Mode 3. Taking a plurality of key frames as model input, the target video is obtained by screening according to the content repetition degree.

Each key frame corresponds to one first quantization feature, and each first quantization feature can match a second candidate video with the same feature; therefore, the ratio between the number of same quantization features and the comparison duration can be determined as the content repetition degree between the query video and the second candidate video.

In an embodiment, the following operations are performed for the at least one second candidate video:
  determining the number of same quantization features between the query video and one second candidate video;
  determining a ratio between the number of same quantization features and a comparison duration as a content repetition degree between the query video and the second candidate video, the comparison duration being a duration value of a shorter video duration in the query video and the second candidate video; and
  determining that a content similarity between the query video and the second candidate video meeting the set content similarity requirement when the content repetition degree exceeding a set content repetition degree threshold value, and outputting the second candidate video as the target video.

For example, assuming that the video duration of the query video is 30 s, a total of 10 key frames are extracted. The number of same quantization features between each second candidate video and the query video is shown in Table 3, the content repetition degree between the query video and each of second candidate videos is obtained by using Mode 2, and finally the second candidate videos 1-2 are returned to the user as target videos.

TABLE 3

| The name of second candidate video | Video duration | The number of same quantization features | Content repetition degree |
| --- | --- | --- | --- |
| Second candidate video 1 | 15 s | 5 | 0.33 |
| Second candidate video 2 | 20 s | 8 | 0.4 |
| Second candidate video 3 | 25 s | 2 | 0.08 |
| Second candidate video 4 | 60 s | 3 | 0.1 |
| Second candidate video 5 | 120 s | 1 | 0.03 |

Figure 4B:
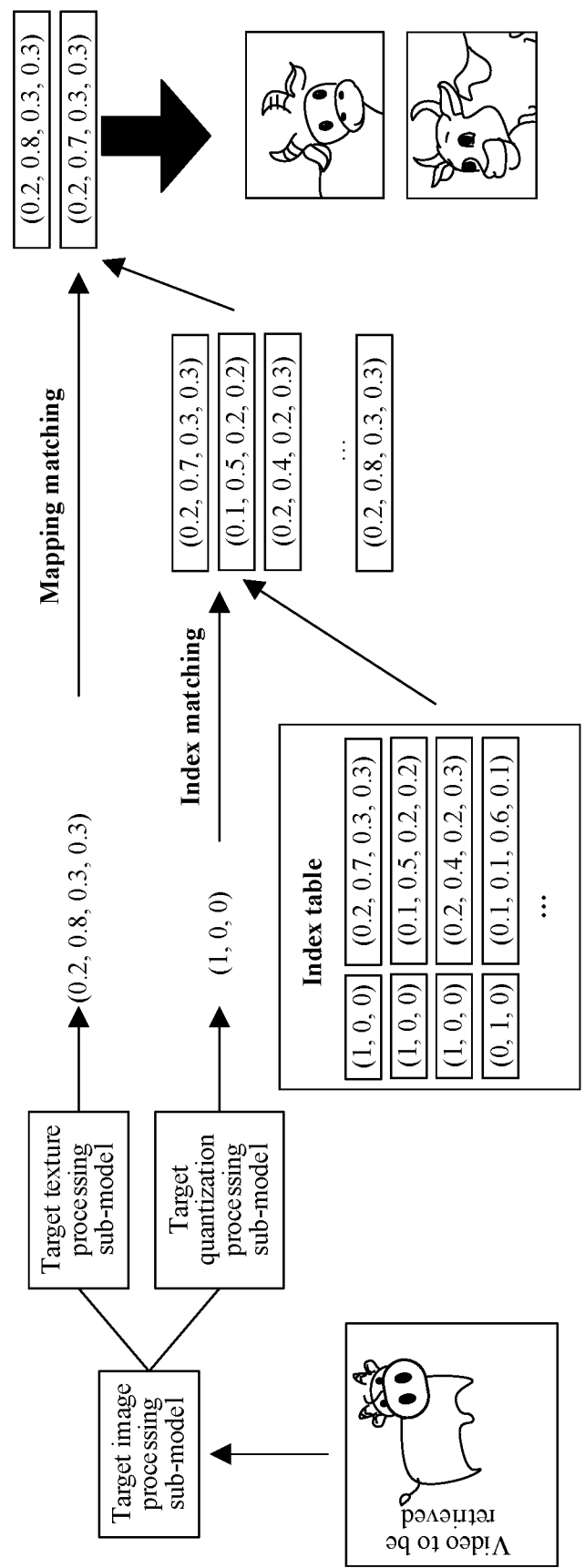
FIG. 4b is a logic schematic diagram of a specific embodiment of the application of a video retrieval method provided by an embodiment of this application.

To facilitate understanding, the process of applying the video retrieval method in a specific embodiment is described with reference to the logic diagram shown in FIG. 4b.

A complete video of a query video is inputted into a trained target video retrieval model to obtain a corresponding first texture feature and a first quantization feature; a plurality of candidate videos with a higher category similarity to the query video are obtained according to the quantization feature distance between the first quantization feature and each of second quantization features in the index table; and then the candidate videos ranked in the first N are taken as target videos with a higher content similarity to the query video according to the texture feature distance between the first texture feature and the second texture feature of each of candidate videos matched in the last round, and returned to the user.

Figure 5:
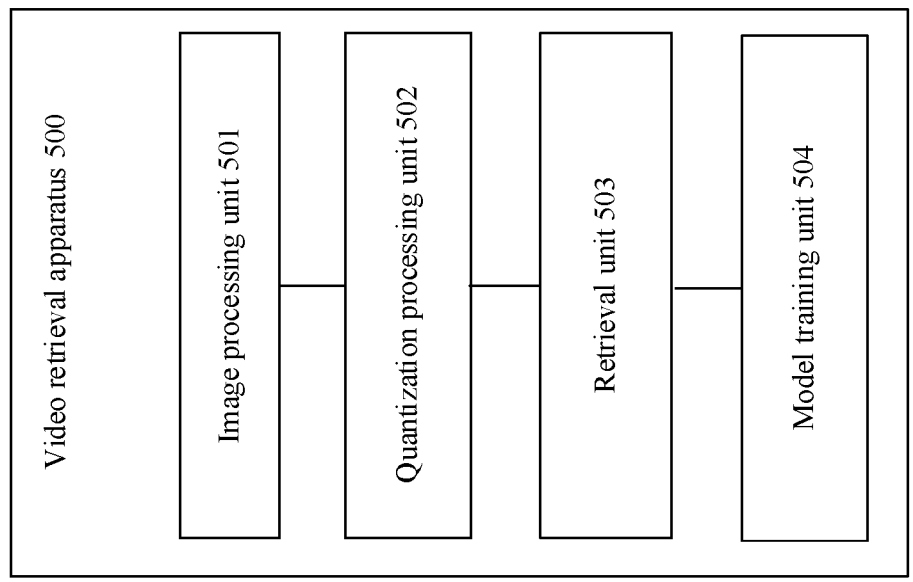
FIG. 5 is a schematic structural diagram of a video retrieval apparatus provided by an embodiment of this application.

Based on the same inventive concept as the above method embodiment, this embodiment of this application also provides a video retrieval apparatus. As shown in FIG. 5, the apparatus 500 may include:

an image processing unit 501, configured to perform feature extraction on a query video using a target image processing sub-model of a trained target video retrieval model to obtain a corresponding image feature;

a quantization processing unit 502, configured to perform feature extraction on the image feature using a target quantization processing sub-model of the target video retrieval model to obtain a corresponding first quantization feature, and screen out from each of first candidate videos at least one second candidate video whose associated category similarity to the query video meets a set category similarity requirement based on the first quantization feature, a quantization control parameter of the target quantization processing sub-model being adjusted based on a texture feature loss value corresponding to each training sample during a training process, and the texture feature loss value being determined based on a texture control parameter preset for a texture processing sub-model to be trained during a parameter adjustment of the texture processing sub-model to be trained; and a retrieval unit 503, configured to output the second candidate video whose associated content similarity to the query video meets a set content similarity requirement as a corresponding target video based on a content similarity between the query video and the at least one second candidate video.

In an embodiment, the target video retrieval model further includes a target texture processing sub-model, and the retrieval unit 503 is configured to:

perform feature extraction on the image feature using the target texture processing sub-model to obtain a corresponding first texture feature; and perform the following operations for the at least one second candidate video: determining a texture feature distance between the first texture feature and a second texture feature of one second candidate video, determining that a content similarity between the query video and the one second candidate video meeting the set content similarity requirement when the texture feature distance being lower than a preset texture feature distance threshold value, and outputting the one second candidate video as the target video, the second texture feature characterizing texture information of one corresponding second candidate video.

In an embodiment, the retrieval unit 503 is configured to: perform the following operations for the at least one second candidate video:

determining a ratio between a total matching duration and a comparison duration as a content repetition degree between the query video and one second candidate video, the total matching duration being obtained based on a matching duration between the at least one second candidate video and the query video, and the comparison duration being a duration value of a shorter video duration in the query video and the one second candidate video; and determining that a content similarity between the query video and the one second candidate video meeting the set content similarity requirement when the content repetition degree exceeding a set content repetition degree threshold value, and outputting the one second candidate video as the target video.

In an embodiment, the retrieval unit 503 is configured to: perform the following operations for the at least one second candidate video:

determining the number of same quantization features between the query video and one second candidate video;

determining a ratio between the number of same quantization features and a comparison duration as a content repetition degree between the query video and one second candidate video, the comparison duration being a duration value of a shorter video duration in the query video and the one second candidate video; and determining that a content similarity between the query video and the one second candidate video meeting the set content similarity requirement when the content repetition degree exceeding a set content repetition degree threshold value, and outputting the one second candidate video as the target video.

In an embodiment, the quantization processing unit 502 is configured to:

determine a quantization feature distance between the first quantization feature and a second quantization feature of each of the first candidate videos; and determine a first candidate video with a quantization feature distance lower than a preset quantization feature distance threshold value as a second candidate video, each second quantization feature characterizing a video category to which a corresponding at least one first candidate video belongs.

In an embodiment, the apparatus 500 further includes a model training unit 504, the model training unit 504 obtains a trained target video retrieval model by executing the following way:

obtaining a plurality of sample triplets, each sample triplet containing a sample video, a positive label and a negative label associated with the sample video;

taking each sample triplets as training data, and sequentially inputting the same into an image processing sub-model to be trained and a texture processing sub-model to be processed to obtain a corresponding first texture set, each time one first texture set being obtained, a corresponding image processing texture feature loss value being generated based on a plurality of first sample texture features contained in the first texture set, and parameters of the image processing sub-model to be trained and the texture processing sub-model to be trained being adjusted based on the image processing texture feature loss value, until the image processing texture feature loss value being not higher than a preset image processing texture feature loss threshold value to obtain a candidate image processing sub-model and a candidate texture processing sub-model; and taking each sample triplet as training data, and sequentially inputting the same into the candidate image processing sub-model, the candidate texture processing sub-model and a quantization processing sub-model to be trained to obtain a corresponding second texture set and a quantization feature group, each time one second texture set being obtained, a corresponding texture feature loss value being generated based on a plurality of second sample texture features contained in the one second texture set, and a parameter of the candidate texture processing sub-model being adjusted based on the texture feature loss value; and each time one quantization feature group being obtained, a corresponding quantization feature loss value being generated based on a plurality of sample quantization features and the texture feature loss value contained in the one quantization feature group, and parameters of the candidate image processing sub-model and the quantization processing sub-model to be trained being adjusted based on the quantization feature loss value, until the texture feature loss value and the quantization feature loss value being not higher than a preset feature loss threshold value to obtain the target image processing sub-model, the target texture processing sub-model, and the target quantization processing sub-model.

In an embodiment, the model training unit 504 is configured to:
adjust a quantization control parameter of the quantization processing sub-model to be trained based on the texture feature loss value.
determine a training sample loss value and a symbol quantization loss value of the quantization processing sub-model to be trained based on a plurality of sample quantization features and the quantization control parameter contained in one quantization feature group; and
generate a corresponding quantization feature loss value based on a training sample loss value and a symbol quantization loss value of a quantization processing sub-model to be trained.

In an embodiment, the model training unit 504 is configured to:
determine a training sample loss value and a symbol quantization loss value of the quantization processing sub-model to be trained based on a plurality of sample quantization features contained in one quantization feature group; and
generate a corresponding quantization feature loss value based on a training sample loss value, a symbol quantization loss value, and the texture feature loss value of the quantization processing sub-model to be trained.

For the convenience of description, the above parts are divided into modules (or units) and described separately according to the functions. Of course, the functions of each module (or unit) may be implemented in the same or in one or more pieces of software or hardware when this application is implemented.

After introducing the access method and apparatus of the service platform according to the exemplary embodiment of this application, next, the computer device according to another exemplary embodiment of this application is introduced.

Those skilled in the art can understand that various aspects of this application can be implemented as a system, a method or a program product. Therefore, various aspects of this application can be embodied in the following forms, namely: hardware only implementations, software only implementations (including firmware, micro code, etc.), or implementations with a combination of software and hardware, which are collectively referred to as "circuit", "module", or "system" herein.

Figure 6:
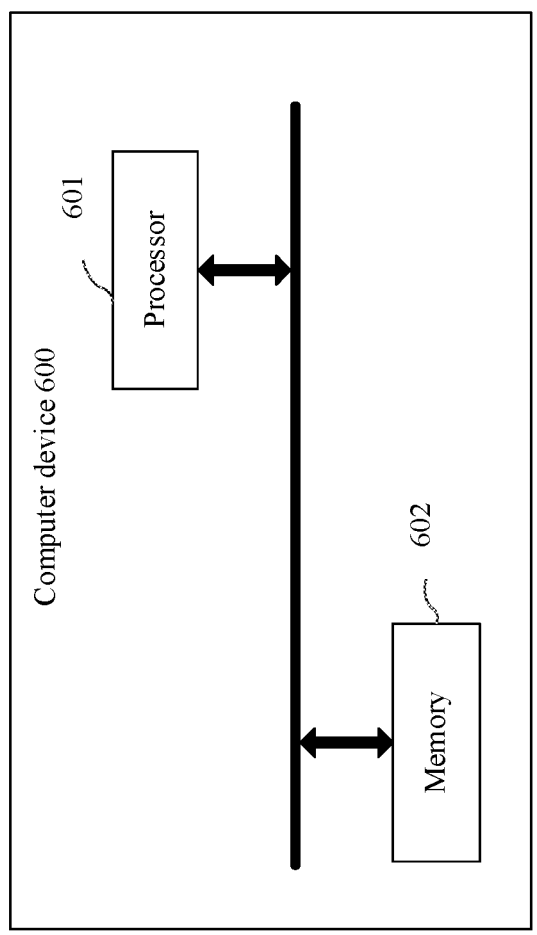
FIG. 6 is a schematic diagram of a composition structure of a computer device provided by an embodiment of this application.

Based on the same inventive concept as the method embodiments described above, a computer device is also provided in embodiments of this application. With reference to FIG. 6, a computer device 600 may include at least a processor 601 and a memory 602. The memory 602 stores program codes which, when executed by the processor 601, cause the processor 601 to perform the operations of any one of the above video retrieval methods.

In some possible embodiments, a computing apparatus according to this application may include at least one processor, and at least one memory. The memory stores program codes which, when executed by the processor, cause the processor to perform the operations in the above-described video retrieval method according to various exemplary embodiments of this application. For example, the processor may execute the operations shown in FIG. 4.

A computing apparatus 700 according to this embodiment of this application is described below with reference to FIG. 7. The computing apparatus 700 of FIG. 7 is merely one example and to be not pose any limitation on the function and application scope of embodiments of this application.

Figure 7:
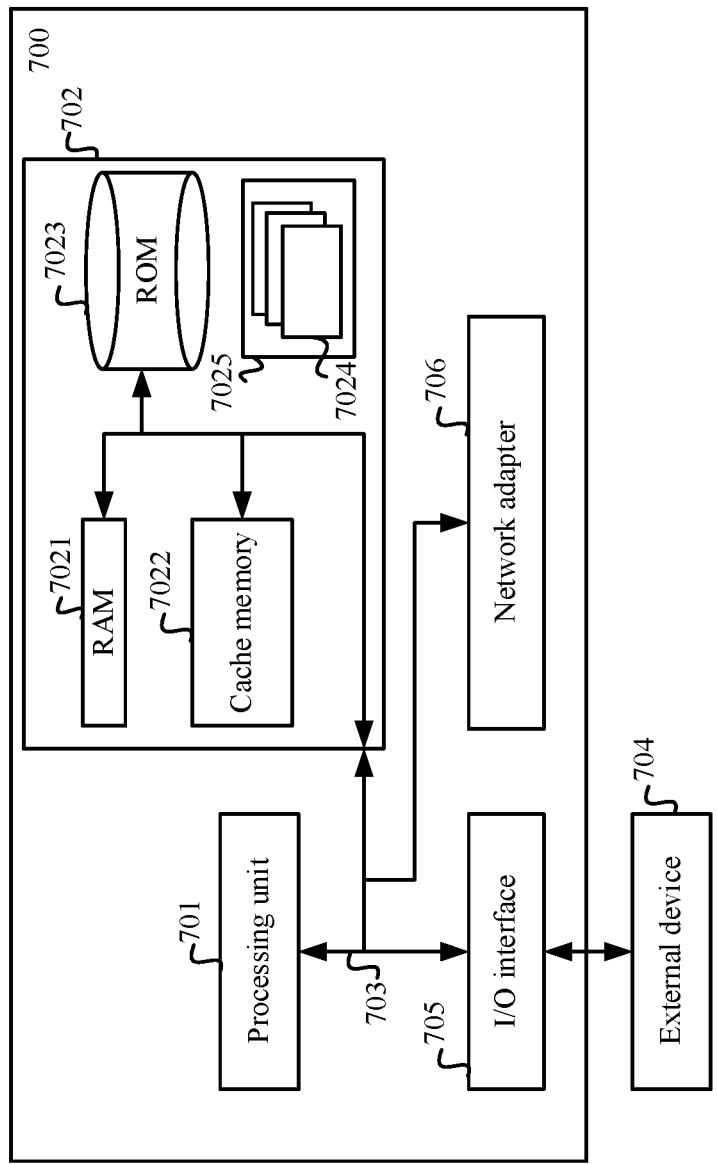
FIG. 7 is a schematic structural diagram of one computing apparatus according to an embodiment of this application.

As shown in FIG. 7, the computing apparatus 700 is represented in the form of a general computing apparatus. Components of computing apparatus 700 may include, but are not limited to the at least one processing unit 701, the at least one memory unit 702, and a bus 703 connecting the different system components (including the memory unit 702 and the processing unit 701).

Bus 703 represents one or more of several types of bus structures, including a memory bus or memory controller, a peripheral bus, a processor, or a local bus using any of a variety of bus architectures.

The memory unit 702 may include computer readable storage medium in the form of volatile or non-volatile memory, such as a random access memory (RAM) 7021 and/or a cache memory unit 7022, and may further include a read-only memory (ROM) 7023. The computer readable storage medium includes program codes which, when run on a computer device, are configured to cause the computer device to execute the operations of any one of the above video retrieval methods.

The memory unit 702 may also include a program/utility 7025 having a set (at least one) of program modules 7024, such program modules 7024 including, but not limited to an operating system, one or more application programs, other program modules, and program data, and each or a combination of these examples may include implementation of a network environment.

Computing apparatus 700 can also communicate with one or more external devices 704 (e.g., a keyboard, a pointing device, etc.), one or more devices that enable a user to interact with computing apparatus 700, and/or any device (e.g., a router, a modem, etc.) that enables computing apparatus 700 to communicate with one or more other computing apparatuses. Such communication may occur through an input/output (I/O) interface 705. Moreover, the computing apparatus 700 can also communicate with one or more networks (such as a local area network (LAN), a wide area network (WAN) and/or a public network, such as the Internet) through a network adapter 706. As shown, the network adapter 706 communicates with other modules for the computing apparatus 700 through the bus 703. Although not shown in the figures, other hardware and/or software modules may be used in conjunction with computing apparatus 700 including, but not limited to: Microcode, device drivers, redundant processors, external disk drive arrays, RAID systems, tape drives, and data backup storage systems and the like.

Based on the same inventive concept as the above method embodiment, various aspects of the video retrieval method provided by this application can also be realized in the form of a program product, which includes program codes. When the program product is run on a computer device, the program code is used to make the computer device execute the operations in the video retrieval method according to various exemplary embodiments of this application described above in this specification. For example, the electronic device can perform the operations as shown in FIG. 4.

The program product can use any combination of one or more readable media. The readable medium may be a computer-readable signal medium or a computer readable storage medium. The readable storage medium can be, for example but not limited to, electronic, magnetic, optical, electromagnetic, infrared, or a semiconductor system, an apparatus, or a device, or a combination of any of the above. More specific examples (a non-exhaustive list) of readable storage media include: an electrical connection having one or more wires, a portable disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

Specifically, this embodiment of this application provides a computer program product or computer program including computer instructions stored in a computer readable storage medium. A processor of a computer device reads the computer instructions from a computer readable storage medium, and the processor executes the computer instructions to cause the computer device to perform the operations of any one of the above video retrieval methods.

Although this embodiment of this application has been described, once persons skilled in the art know a basic creative concept, they can make other changes and modifications to these embodiments. Therefore, the following claims are intended to cover this embodiment and all changes and modifications falling within the scope of this application.

Obviously, a person skilled in the art can make various modifications and variations to this application without departing from the spirit and scope of this application. In this case, if the modifications and variations made to this application fall within the scope of the claims of this application and their equivalent technologies, this application is intended to contain these modifications and variations.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A video retrieval method, performed by a computer device, the method comprising:
   receiving a search request from a terminal device, the search request including a query video submitted by a user through a video retrieval interface;
   performing feature extraction on the query video using a target image processing sub-model of a trained target video retrieval model to obtain a corresponding image feature of the query video;
   performing feature extraction on the image feature using a target quantization processing sub-model of the target video retrieval model to obtain a corresponding first quantization feature;
   identifying, from first candidate videos, at least one second candidate video whose associated category similarity to the query video meets a set category similarity requirement based on the first quantization feature;
   identifying, among the at least one second candidate video, a target video whose associated content similarity to the query video meets a set content similarity requirement, further including:
      determining a ratio between a total matching duration and a comparison duration as a content repetition degree between the query video and one second candidate video;
      determining that a content similarity between the query video and the one second candidate video meets the set content similarity requirement when the content repetition degree exceeds a set content repetition degree threshold value; and
      identifying the one second candidate video as the target video; and
   returning the target video to the terminal device, wherein the target video is configured to be presented on the video retrieval interface and a progress bar of the target video includes at least one segment that is deemed to be similar to the query video and marked visually different from the rest of the target video.

2. The method according to claim 1, wherein the total matching duration is determined as a matching duration between the at least one second candidate video and the query video, and the comparison duration is determined as a duration value of a shorter video duration between the query video and the one second candidate video.

3. The method according to claim 1, wherein the identifying, from first candidate videos, at least one second candidate video whose associated category similarity to the query video meets a set category similarity requirement based on the first quantization feature comprises:
   determining a quantization feature distance between the first quantization feature and a second quantization feature of each of the first candidate videos; and
   determining a first candidate video with a quantization feature distance lower than a preset quantization feature distance threshold value as a second candidate video, each second quantization feature characterizing a video category to which a corresponding at least one first candidate video belongs.

4. The method according to claim 1, wherein a quantization control parameter of the target quantization processing sub-model is adjusted based on a texture feature loss value corresponding to each training sample during a training process.

5. The method according claim 4, wherein the texture feature loss value is determined based on a texture control parameter preset for a texture processing sub-model to be trained during a parameter adjustment of the texture processing sub-model to be trained.

6. A computer device comprising a processor and a memory, the memory storing program codes that, when executed by the processor, cause the computer device to perform a video retrieval method including:
   receiving a search request from a terminal device, the search request including a query video submitted by a user through a video retrieval interface;
   performing feature extraction on the query video using a target image processing sub-model of a trained target video retrieval model to obtain a corresponding image feature of the query video;

performing feature extraction on the image feature using a target quantization processing sub-model of the target video retrieval model to obtain a corresponding first quantization feature;

identifying, from first candidate videos, at least one second candidate video whose associated category similarity to the query video meets a set category similarity requirement based on the first quantization feature;

identifying, among the at least one second candidate video, a target video whose associated content similarity to the query video meets a set content similarity requirement, further including:

determining a ratio between a total matching duration and a comparison duration as a content repetition degree between the query video and one second candidate video;

determining that a content similarity between the query video and the one second candidate video meets the set content similarity requirement when the content repetition degree exceeds a set content repetition degree threshold value; and identifying the one second candidate video as the target video; and returning the target video to the terminal device, wherein the target video is configured to be presented on the video retrieval interface and a progress bar of the target video includes at least one segment that is deemed to be similar to the query video and marked visually different from the rest of the target video.

7. The computer device according to claim 6, wherein the total matching duration is determined as a matching duration between the at least one second candidate video and the query video, and the comparison duration is determined as a duration value of a shorter video duration between the query video and the one second candidate video.

8. The computer device according to claim 6, wherein the identifying, from first candidate videos, at least one second candidate video whose associated category similarity to the query video meets a set category similarity requirement based on the first quantization feature comprises:

determining a quantization feature distance between the first quantization feature and a second quantization feature of each of the first candidate videos; and determining a first candidate video with a quantization feature distance lower than a preset quantization feature distance threshold value as a second candidate video, each second quantization feature characterizing a video category to which a corresponding at least one first candidate video belongs.

9. The computer device according to claim 6, wherein a quantization control parameter of the target quantization processing sub-model is adjusted based on a texture feature loss value corresponding to each training sample during a training process.

10. The computer device according to claim 9, wherein the texture feature loss value is determined based on a texture control parameter preset for a texture processing sub-model to be trained during a parameter adjustment of the texture processing sub-model to be trained.

11. A non-transitory computer readable storage medium storing program codes that, when executed by a processor of a computer device, cause the computer device to perform a video retrieval method including:

receiving a search request from a terminal device, the search request including a query video submitted by a user through a video retrieval interface;

performing feature extraction on the query video using a target image processing sub-model of a trained target video retrieval model to obtain a corresponding image feature of the query video;

performing feature extraction on the image feature using a target quantization processing sub-model of the target video retrieval model to obtain a corresponding first quantization feature;

identifying, from first candidate videos, at least one second candidate video whose associated category similarity to the query video meets a set category similarity requirement based on the first quantization feature;

identifying, among the at least one second candidate video, a target video whose associated content similarity to the query video meets a set content similarity requirement, further including:

determining a ratio between a total matching duration and a comparison duration as a content repetition degree between the query video and one second candidate video;

determining that a content similarity between the query video and the one second candidate video meets the set content similarity requirement when the content repetition degree exceeds a set content repetition degree threshold value; and identifying the one second candidate video as the target video; and returning the target video to the terminal device, wherein the target video is configured to be presented on the video retrieval interface and a progress bar of the target video includes at least one segment that is deemed to be similar to the query video and marked visually different from the rest of the target video.

12. The non-transitory computer readable storage medium according to claim 11, wherein the total matching duration is determined as a matching duration between the at least one second candidate video and the query video, and the comparison duration is determined as a duration value of a shorter video duration between the query video and the one second candidate video.

13. The non-transitory computer readable storage medium according to claim 11, wherein a quantization control parameter of the target quantization processing sub-model is adjusted based on a texture feature loss value corresponding to each training sample during a training process.

14. The non-transitory computer readable storage medium according to claim 13, wherein the texture feature loss value is determined based on a texture control parameter preset for a texture processing sub-model to be trained during a parameter adjustment of the texture processing sub-model to be trained.

15. The non-transitory computer readable storage medium according to claim 11, wherein the identifying, from first candidate videos, at least one second candidate video whose associated category similarity to the query video meets a set category similarity requirement based on the first quantization feature comprises:

determining a quantization feature distance between the first quantization feature and a second quantization feature of each of the first candidate videos; and determining a first candidate video with a quantization feature distance lower than a preset quantization feature distance threshold value as a second candidate video, each second quantization feature characterizing a video category to which a corresponding at least one first candidate video belongs.

\* \* \* \* \*